Patented Apr. 7, 1942

2,278,463

UNITED STATES PATENT OFFICE 2,278,463

EXPANDED FOOD PRODUCT AND METHOD OF PRODUCING THE SAME

Albert Musher, New York, N. Y., assignor, by mesne assignments, to Food Manufacturing Corporation, Chicago, Ill., a corporation of New York No Drawing. Application September 13, 1938, Serial No. 229,711

17 Claims. (Cl. 99—204)

The present invention relates to expanded food products and to methods of producing the same and it particularly relates to the expansion of low starch or non-starchy food materials especially those of a fibrous, cellulosic or protein nature, such as fruits, vegetables, fish, and meats.

This invention is particularly applicable to foods which in their original condition have a high moisture content in excess of 35 to 50%.

In preparing for use or consumption various types of starchless or low starch fibrous foods such as fruits, vegetables, meats and fish, it is necessary to subject them to prolonged boiling and cooking periods in order to separate the fibres and soften them sufficiently to allow for proper masticating, digestion, and so forth.

It has been found that when these fruits, vegetables, meats and fish are dehydrated before sale or consumption, it is also desirable or necessary to subject them to a prolonged soaking period, often overnight before they may be properly cooked to sufficient tenderness so as to form a soup, sauce or other finished food material because of the hardness or toughness that is developed upon drying or dehydration and storage. This toughness or hardness or resistance against cooking or absorption of water is due not alone to the natural hardness of the food or to the fibres therein, but in a great many cases this is due also to the resinous, pasty, gummy and similar materials that surround these fibres in their natural condition or which may be developed through oxidation or deterioration upon dehydration or while these dried food products remain in storage before sale and consumption.

It is therefore among the objects of the present invention to prepare food products of the character above described which may be cooked with water or aqueous materials to produce a finished food preparation whether it be a dessert, soup, or a sauce or some other material without the necessity of subjecting such fruits, vegetables, meats, fish, or similar food products to prolonged preparation as by soaking as in the case of dried or dehydrated foods, or without any need whatsoever of subjecting them to prolonged boiling periods, for example, from one-half hour to three hours.

Another object is to prepare such food materials into a form that they may be substantially more readily and more quickly cooked so as to more quickly develop their desired cooked flavor and so as to retain substantially all or more of the desired flavors, essences, food values, vitamins, and other characteristics or essentials which normally would be destroyed, or inactivated or eliminated by prolonged cooking or prolonged heating or other preparation processes.

Still further objects and advantages will appear in the more detailed description set forth below, it being understood however that this more detailed description is given by way of illustration and explanation only and not by way of limitation, since various changes therein may be made by those skilled in the art without departing from the scope and spirit of the present invention.

The invention is applied to normally high water content meat, fish, fruit, or vegetable materials. Examples of such fruit and vegetable materials are raw carrots, celery, peppers, mushrooms, peaches, apricots, pineapples, pears, apples, plums, figs, cranberries blueberries, huckleberries, strawberries, asparagus, rhubarb, cabbage, cauliflower, parsnips, artichoke, okra, eggplant, pumpkin, etc., which are first dehydrated and then expanded to place them in readily cookable form.

Under suitable conditions various parts of beef, veal, pork, poultry, or mackerel, smelts, sardines, shrimp, fish roe as for instance, shad roe, sturgeon roe, caviar, and so forth may also be treated and converted into readily or easily cookable products by successively dehydrating and expanding them.

In dehydrating, these food materials are subjected to any of the various drying methods such as to heat or to hot air at such a temperature and for such a length of time so as to reduce their water content from above 35 to 50% and usually from above 70% and even from above 85 to 90% to below 35% and preferably below around 20% and most preferably below 10 to 12%.

This drying process should preferably remove the required amount of water content from the food products without substantially causing any change in the wholeness or unity thereof and without causing substantially any loss in the flavors, vitamins, essences, food values, or other similar characteristics in the particular food product being treated.

The dehydrated material then containing its relatively reduced quantity of moisture, for instance, below 12% or even below 5% is then subjected to an expansion procedure which will increase its mass or bulk substantially and soften or separate its fibres.

According to this procedure the substantially dehydrated food material containing for example, less than 20% or perhaps less than 10% of moisture is then subjected to a treatment at relatively elevated temperatures and pressures. For best results the pressure should usually be above 20 or 25 pounds per square inch and preferably should be above 40 or 50 pounds per square inch and in some cases it may run as high as 350 pounds or more per square inch.

Generally the temperature should be above 200° to 250° F. and preferably within a range of about 350° to 800° F. The most preferred range is usually between 400° and 600° F.

This expansion treatment is carried on for a time period and at a pressure and temperature depending upon a number of factors as for instance, the moisture present in the food product, the softness of the food product, the degree of expansion desired, the type of equipment used, whether dry heat or steam or superheated steam is used for the expansion chamber, the time, temperature and pressure conditions themselves, and similar other factors.

The required time for exposure may be 18 to 20 minutes or longer, or it may be under ten minutes and even less than several minutes, whereas in many cases it may be under one minute, and often several seconds or 15 to 45 seconds will suffice to complete the treatment and to give the best result.

The amount of moisture withdrawn or removed before expansion should be such as to give the best results to carry out the expansion process. With a large number of food products it is preferred to reduce the moisture content of the foods from above 40% or 50% and usually from above 70% or 80% to below 35%, or preferably to between about 4% and 20%.

If the product to be expanded is a little too dry additional moisture may be added to the product or to the expanding chamber, as for example, in the form of water or other aqueous material or in the form of steam or preferably superheated steam.

This expansion treatment in its generally preferred embodiment is carried out in a steam atmosphere and this steam may be developed by various methods as for instance, from the moisture within the food that is being processed, or by the injection into the pressure chamber of steam, etc. This steam may be controlled so as to maintain or change the moisture content of the food being treated so as to obtain the best results. The moisture added may also consist of, or include, fruit, vegetable, meat, or other juices derived by extraction, expression, or cooking of the same or other food materials than those being processed.

After this treatment at elevated temperatures and pressures as above stated the vegetable, fruit, meat, fish or other food, as the case may be, is suddenly released to atmospheric pressure and temperature as by opening the particular vessel in which it has been treated whether such vessel be of the form of an autoclave or a pressure gun or some other suitable apparatus.

After the treated vegetable or fruit has been permitted to drop suddenly to atmospheric pressure and temperature, it is found that the texture and structure thereof has been substantially changed in many cases without any substantial decrease or modification in the content of vitamins, flavors, essences and other food essentials. The food whether it be a fruit or vegetable will often be increased as much as 4 to 6 times in volume and even more.

With fibrous, cellulosic materials as vegetables or fruits, and even with fibrous protein materials such as meat or fish, it is found that the compact fibres have been to a large degree separated and softened and that a large number of passages and pores are formed, many of which are greater than capillary size into which water may readily penetrate particularly at elevated boiling temperatures of for instance, 150° to 212° F.

These new porous food materials may now be placed in hot or boiling water and they, in some instances, will be substantially instantaneously or at least they will be very much more readily and more quickly cooked. When cooked they will have all of the desirable characteristics of the cooked vegetable, fruit, meat or fish food which ordinarily may have required soaking overnight and prolonged boiling from one-half to three hours.

Furthermore, the flavors and essences and aromas of the cooked vegetable, fruit or meat are greatly enhanced. It appears that the water of the boiling bath has the opportunity of entering into the interstices between and into the separated fibres and into its pores, openings and cells, and of developing the flavors therein to a much higher degree than would result from prolonged boiling of the original unexpanded product. The destruction of the flavors and essences and food values that accompany prolonged boiling is avoided.

With the dehydrated and expanded food products of the present invention there is a tremendously greater contact between the boiling liquid and the expanded food material. Even with a relatively very short boil which in some cases may be as little as one to two minutes there is much superior contact over a tremendously greater area between the liquid and the food material than heretofore resulted from even prolonged boiling periods of the same material in its original unexpanded and unseparated condition. The increase in surface area of the food amounts in many cases from 100% to 1000% or more.

In applying the present invention to some food materials it has been found advantageous to first parboil or cook or steam, etc., the food material and then to drain off any excess water and then to dry and dehydrate and expand the food material as above stated.

This procedure in many cases provides a finished expanded food requiring even a shorter time for cooking, and resulting in a softer, more digestible and more tender finished product.

*Example I*

As an example of this invention, raw carrots are divided into small portions or diced. These pieces of carrots are then placed upon trays and placed in a dryer where hot air is passed thereover.

The layers of carrots generally do not exceed about one-half to three inches in thickness as desired. The drying operation is continued for a period of time until the moisture content of the carrots has been reduced from around 85% down to about 5 to 10%.

In some instances it may be desirable to increase the rate of drying by gradually increasing the temperature of the drying gas which may preferably be air but which may also consist of a mixture of carbon dioxide with air or of carbon dioxide by itself or even nitrogen.

The carrots of course may also be subjected to drying either in the sun or by placing upon a hot oven or in any other suitable or present employed manner.

These dried carrots containing about 5 to 10% of moisture are then placed in a closed chamber or in a pressure gun. They then are elevated to a temperature of about 450 to 500° F. while permitting superheated steam to be raised to a pressure of about 50 to 60 pounds per square inch.

After this temperature and pressure has been maintained for 15 or 20 seconds, the cover is released and the pressure and temperature is suddenly decreased to atmospheric pressure and temperature. As a result the carrot pieces will quickly expand with the further resulting separation and disintegration of the fibres therein and with the formation of pores and passages therein many of which are greater than capillary size. The carrot pieces appear to form a relatively spongy-like mass into which water can readily penetrate particularly at relatively elevated temperatures of 180 to 220° F. upon cooking.

The volume of the carrots is from 2 to 4 times greater and sometimes as much as 5 or 6 times or more greater than their original volume and furthermore because of the porosity of these expanded carrots, there is a large amount of air included in the interior of the expanded and separated carrot pieces.

The expanded carrot pieces may then be dropped into water having a temperature from 150 to 220° F. and they will be substantially immediately or quickly cooked. When so cooked they will have all of the desirable flavors and characteristics of long boiled carrots. Moreover there will be a more satisfactory development of the carrot flavor in a degree not previously possible.

The food value and the flavor of the short-boil expanded carrots is much more fully retained and the carrots have a much better flavor than the raw or dehydrated carrots would have had if they had been initially subjected to boiling from one-half to one hour or longer with or without previous soaking in water and with or without previous usual softening or tendering processes.

Celery, turnips, potatoes, red or green peppers, apples, mushrooms, cucumber rind, suitable green and leafy vegetables and various other vegetable, fruit, meat or fish materials may be treated in relatively the same manner as the carrots above described.

*Example II*

Raw apricots or peaches are split and the pits removed. The usual sulphur treatment or other usual pre-drying treatment is given to the fruit. The split portions are then dehydrated in the sun or upon drying shelves with air having a temperature of around 130° to 170° F. until they contain around 15% to 20% moisture.

The dried apricots or peaches are then treated with the addition of steam in a tightly closed vessel at an elevated temperature of 250° F. to 350° F. and at a pressure of 40 to 60 pounds per square inch for about 15 seconds to 50 seconds.

The material then is suddenly released to atmospheric pressure with the result that it will expand to between 1½ to 2 times its original dried volume.

These expanded peaches or apricots may then be dropped into boiling water to produce a fully cooked peach or apricot as the case may be without any substantial loss of flavor or fragrance of the original fruit and with an enhancement of such fragrance as compared to ordinary canning and cooking processes which necessitate the use of lye or other drastic treatments.

The expanded dehydrated apricots produced in accord with this example appear to be substantially devoid of the objectionable tough, gummy or resinous qualities which are customarily found in dried apricots and which cause dried apricots to be tough so as to render them difficult to use without soaking or similar processing. Particularly when the dried or dehydrated apricots or similar fruits or foods have been kept standing for a considerable length of time between the dehydration and the expansion, does there develop these tough qualities although the resinous, gummy or pasty materials may be present in the raw food and be developed or intensified by oxidation, deterioration, the drying process, etc.

Although it is usually desirable to expand the dried apricots or other foods such as dried pears, peaches, other high sugar materials, etc., as soon as they have been dehydrated, it is, nevertheless, possible and in some cases preferred to permit them to stand for a considerable length of time between the dehydration and expansion procedures and to expand them after there has been a considerable development of the gummy or resinous or tough materials therein, and particularly in the outer portions thereof.

The expansion procedure however appears to render the apricots and similar dried foods, quickly usable, regardless of how much of this resinous or gummy quality has developed. This advantage is noticeable in such examples as fruits and vegetables where there is a high sugar content and where the sugar has the tendency to harden or crystallize upon standing and also in alubuminous or protein foods where they become gummy or tough upon standing.

At various points in the process, particularly before, during or after the drying or dehydration of the various food products treated in and with this invention, these foods may be subjected to freezing, and particularly to slow freezing so as to disintegrate further the fibrous structure of the food. After this freezing process it will usually be desirable to dry or dehydrate the food again before continuing with the remainder of the process.

The size, porosity and other characteristics of the food materials made under this invention may be controlled by varying such factors as the extent of dehydration, the temperature of the expansion treatment, the time of the expansion treatment and the pressure to which the food pieces are subjected during such expansion treatment.

Also the atmospheric conditions to which the foods are subsequently subjected upon removal from the pressure chamber or gun will also largely control the porosity and characteristics of the dehydrated and expanded food pieces. It is also possible to control the expansion, porosity, etc., and to develop variations or new characteristics and qualities in the treated foods of this invention by ejecting them from the pressure chamber into atmospheres having higher or lower pressures than atmospheric or into a partial or complete vacuum, and also into various atmospheres which may contain carbon dioxide, nitrogen or even quantities of oil or aqueous vapors.

It is desirable at times to produce a double or multiple expansion by first expanding from one pressure to a lower pressure or to atmospheric, and then again expanding one or more times between the same or other pressures and/or temperatures. This multiple expansion may be used not only to control the porosity or to vary the character of the food pieces, but it may be used with many food materials which cannot well withstand a high heat or pressure treatment. In this procedure these materials may be subjected to one or more additional expansions at temperatures ranging for example, between 150° F. and 350° F. and at pressures ranging for example, between 20 pounds and 40 pounds.

It is desirable at times to place a coating on or within the pieces of food products so as to permit the formation of harder walls and thereby to result in a greater or more efficient explosion of the product. The placing of such a coating on or within the food pieces for this purpose is particularly desirable after the food pieces have been expanded one or more times and it is desired to increase the expansion further by additional explosion. Starch, resins, gums, and similar materials may be used to provide such a coating.

If desired to prevent absorption of air by the expanded vegetables, fruits, meats or fish after they are released from the high pressure chamber, it may be desirable to permit them to be ejected into a chamber devoid of air or even into a liquid medium. This medium may be a paste or solution of starch, gelatin, a pectin, or it may be a molten sugar, or a liquid oil, or a solid or plastic fat or oil which may be in molten condition at the time of the ejection, or some other material which will impregnate and fill up the pores without permitting the indraft or the addition of air thereto which might cause or accelerate oxidation or deterioration therein.

An important advantage of the present invention resides in the fact that the dehydration followed by the separation and expansion treatment will separate the fibrous or resinous or similar structure of the food product so that it may even be eaten without cooking or further treatment. There will be assurance that their digestion qualities are greatly improved even if the expanded material be eaten without cooking, in view of the fact that the known indigestible qualities of various raw vegetables, fruits and meats, etc., due to their fibrous or resinous or toughened nature will be avoided to a very remarkable degree.

Moreover, the various vegetables, fruits and meats, etc., which may be treated by the dehydration and expansion treatment of the present invention and various food compositions made therefrom are most advantageously cooked because of the fact that they do not immediately sink to the bottom of the vessel to the same extent as the untreated foods. Because of their high air or gas content they float to an extent during the cooking operation and do not sink so quickly to the bottom of the pot and thereby they do not burn so readily. Also they will be much more quickly saturated with the boiling or cooking liquid as the case may be during the short boil procedure.

The sponge-like structure which results under this invention to various food products has an important advantage in that it may be used to absorb various types of flavors or essences such as meat extracts or flavoring solutions and then it may be subsequently dehydrated or dried so that the sponge or expanded food pieces will contain within itself the flavors or other materials which it may be desired to add to the food.

EXAMPLE III

The porous carrots, beets, mushrooms, turnips, peppers, etc., produced as above noted, may be used to soak up liquid meat extract so that upon cooking with water there would be obtained cooked carrots or other materials with a meat flavor or sauce. They may also be caused to absorb a salt-sugar solution so that a flavored cooked material may be obtained by just placing the expanded food pieces in water and subjecting them to a short boil.

EXAMPLE IV

Expanded sponge-like plums, apricots, peaches, apples, dates, figs, or berries produced in accord with this invention may be treated with or caused to absorb a sugar solution or syrup or another flavoring material or even may be caused to absorb pectin or other materials so that when stirred into boiling water or boiled in water, they will form either a fruit sauce or a quick jelling mixture which may be readily converted into a jam or jelly, or similarly prepared food combinations.

The preferred method to accomplish the above would be to provide an aqueous extract for example, of pectin, a fruit flavor, and sugar and then to cause this to be absorbed by the new-processed fruit. The combination may then be dried to remove the excess moisture and to cause the added material to adhere more closely to the porous expanded pieces.

The resulting dried product may be dropped when required for use into a boiling sugar solution or cooked therewith to form an immediate jell or jam composition.

The expanded materials of this invention may be also compressed to enable more economical packaging or may even be compressed into brick or similar solid form with the assurance that when such bricks are placed in boiling water they will will be immediately disintegrated and converted into their usual condition with their consequent usual advantageous qualities and characteristics.

Although these expanded dehydrated vegetables, fruit, meat and fish compositions may be utilized for many different purposes, one particular utilization which has been found to be most advantageous is to form these materials into a brick form with or without substantial pressure and in the presence of an adhesive agent or a binder. This binder may be a material which will also fill the pores of the porous material so as to prevent the ingress of air in order to eliminate various possibilities of oxidation. On the other hand, this binder may also be a binder which will adhere to the food materials and bind them together to form a brick or to compact them, etc.

Among the preferred binders are those materials which have the quality of becoming fluid at warm or hot temperatures so as to be more readily absorbed or so as to be more adhesive and so as to give more surface coverage, and which materials at cooler temperatures return to a hardened or plastic condition or which can be made hard by drying or similar processing.

Examples of such preferred binders are hardened oils or fats, sugars, various waxes and resins, etc. Several examples of fats of this nature are hydrogenated cottonseed oil, hardened oleo fat, vegetable oil, stearine of various melting points, and preferably at times of 110° F. melting point.

These materials are particularly advantageous since they are most helpful in displacing the air in the product.

Example V

The expanded dehydrated vegetable, fruit, fish, or meat as the case may be, may be stirred into the molten fat. This molten fat will seep into the openings, pores, capillary passages and into and between the fibres of the expanded product and replace substantially all the air therein so that the expanded product will be less susceptible to oxidation and deterioration.

If desired one type of material may be utilized for filling the pores of the expanded fruit, vegetable or meat and another type of coating may be utilized to protect the exterior. A molten hard fat may be utilized to fill the pores or passages within the material which has been expanded, while a molten wax, or a resin, or a molten sugar may be used as an exterior coating.

As a method for incorporating the molten hard fat or other material with the expanded food it is at times very desirable after having dipped the expanded porous food into the molten coating material, to subject the entire mass to a quick chilling with or without draining off the excess fluid. This method helps to congeal the molten material within the pores and on the food, faster and more completely.

It has been found very advantageous for many purposes to have the pores of the expanded material filled and the food coated so as to replace and exclude as much air as possible since the desirable flavors, odors, vitamins, and so forth within the material are much better preserved upon long storage or upon shipping, etc. when the food has been substantially sealed to the exclusion of a good part or all of the air therein.

Example VI

The expanded dehydrated vegetable, fruit, fish or meat as the case may be is first soaked in an aqueous solution of sugar, salt, dextrine or some other suitable material, and then evaporated or dried followed by the absorption and/or coating of an oil or a hydrogenated or hard fat as the case may be.

It is possible to absorb into the material a coating or surfacing agent such as a water solution of dextrine or gum or sugar and the deposited gum or dextrine upon the pores, passages and interior surfaces will substantially protect these interior portions of the material from the effective air.

These fats, dextrines, waxes, or gums, starches, gelatin, albumens, pectin, or other materials or various combinations thereof, in aqueous solution where required, may be used in the above applications. They may be used to form coatings upon the exterior or interior of the expanded pieces, or they may be used as a medium to carry various antioxidants or treating materials into the pores and over the surfaces of the food products, and they may further be used to form an advantageous adhesive base by which the treated pieces may be compacted or adhesively connected together, or with other materials such as salt, spices, condiments and so forth. They also enable the materials most advantageously to be compacted into the form of a cake or brick or in any form with or without pressure.

Example VII

In compacting expanded food products for more economical packaging, etc., the expanded foods of this invention with or without other food components, seasonings, etc. may be stirred into a molten hard fat which may contain other flavoring materials or other expanded materials depending upon what is to be included in the final food composition. This material after it comes out of the fatty bath and while the fat is still plastic may be compressed into a smaller volume.

Then upon hardening of the fat such smaller volume will be retained and at the same time the resiliency of the expanded material will be such that it will readily spring back into shape when it is placed into boiling water or other liquids with which it is to be combined to form the final food composition.

In place of the molten fat referred to, liquid or molten resins or gums, or solutions or pastes of starch, pectin, etc., or combinations thereof may be used. After the material has absorbed the molten fat or similar product or after it has been thoroughly coated and impregnated with this molten fat or similar material, such combination of expanded pieces and molten fat may be stirred or agitated or preferably, whipped, while congealing, so as to pick up air, nitrogen, carbon dioxide, ozone, or other such materials or airifiers so that relatively airified or gasified bricks or pieces will be obtained.

When these bricks are placed into hot water or when they are boiled they will more readily disintegrate on account of their porous or airified structure. Also because of their aerated form they will float on top of the liquid rather than sink to the bottom of the pot. This results in materially less possibility of burning caused by having the food contact the bottom of the cooking vessel. The airifying of the fat or of other binders or similar materials produces sealed air or gas pockets within the fat or binder material which gives materially increased floating power to the hardened brick even aside from any of the floating power that might come in some degree from the porous nature of the expanded foods themselves or from any air sealed within these pores.

Generally where a molten hard fat or similar material may be employed it is desirable in some instances while such fat or other material is being applied to keep it at a high temperature preferably above the boiling point of water to remove any residual water or moisture that it is desired to remove, and also to kill any residual bacteria or to sterilize the product so as to enable materially improved keeping qualities. For sterilization, materially higher temperatures than for removing excess water are generally preferred.

Where it is desired to use expanded foods in combination with cold liquids such as cold milk and so forth, it is often found desirable to combine and to use as a binder for the brick, a water miscible material which does not require hot or boiling to melt or disintegrate the binder material. An example of such a binder would be various sugars or sugar syrups which could be used as binders to compact the expanded materials into brick form, but which would dissolve in cold milk or cold water when the finished brick is placed in such liquids.

Several examples of food products made into a brick form with expanded food materials follow:

*Example VIII*

A combination of pieces of the dehydrated and expanded carrots, peppers and celery in amounts of 20 grams, 5 grams and 5 grams respectively are stirred together with salt, pepper and paprika together with some dry tomato powder and onion powder. These ingredients are then mixed in a bowl with 120 grams of 110° melting point hydrogenated oil at a temperature of about 220° F.

This mixture is thoroughly stirred until the fat congeals so as to obtain proper dispersion of the dry materials in the molten fat. If desired, before the fat hardens, the mixture may be molded or it may be compressed with or without pressure into a brick. If desired it may instead be allowed to congeal and cut into pieces, or packed or pressed into containers as for instance, glass jars, cans, cartons, etc.

The product may also be agitated or it may be whipped, so as to take up air or other gaseous material, this whipping being done preferably while the fat or similar material is in the process of congealing before it becomes hard.

The final product then is a finished food material which may be readily cut into required sizes or shapes if it has not already been so molded and it may then be packaged in containers, such as cans, parchment paper, cartons, jars, and it may then be readily merchandised and sold as such and it may then be added to a boiling water or boiled in water so as to be quickly and readily converted into a soup or sauce or other finished food as the case may be.

In order to quicken the congealing process and also in order to keep a maximum amount of fat from penetrating into the pores and fibres of the expanded foods, where this is desirable, it has been found that quick chilling of the molten fat or similar material with the expanded foods with or without other food components is very desirable.

It is most preferred, when forming cakes or bricks containing various types of expanded materials into a dessert, or a soup, or a sauce or into other foods, that the various solid ingredients in the cake such as the expanded carrots, or the other pieces of fruits or vegetables or meats and so forth should all be processed so as to have about the same boiling period. All these materials should be convertible into a final boiled or cooked condition within approximately the same length of time.

It is most desirable that in a cooked vegetable sauce for instance, that when the carrots are cooked to the required tenderness that the celery and the peppers, likewise should be cooked to the required tenderness so as to avoid the necessity for overcooking some portion of the vegetables and undercooking other portions.

A compacted solid food, brick, cake or unit of the character described when compacted with or coated with a water resistant material as for instance, hard fats or oils, is substantially protected from the moisture in the air or from other water or moisture with which it may come in contact during storage. This is of particular importance in view of the absorbable nature of these expanded food materials.

Also, the nature of the compositions produced in this solid brick, cake or unit form enables novel packaging to be carried out. For instance, heretofore it has been necessary for a consumer to purchase carrots separately, peppers separately, celery separately, etc., in the event that the consumer wishes to make a small portion of a soup or other food combination containing these three vegetables. Furthermore it has been necessary for the consumer to purchase these three vegetables in much larger quantities, as for example, in quarts, pounds, etc., than the consumer might wish to use in preparing such a limited quantity of food. Moreover, the excess materials which are not used must be stored or protected against spoilage thereby consuming the limited available space in the kitchen or in the icebox.

However, in accord with the present disclosure it is now possible to provide a single package which will contain one or more bricks, cakes, or units each including one or more different food materials adhesively bound together so that they will be present in sufficient and proper proportion to form the soup or food preparation.

These foods in cake, brick, or unit form also have substantially longer keeping quality. In this solid unit form, the ingress of weevils, and other infestation, and bacteria and mold growth is substantially retarded or eliminated, particularly non-porous, and/or non-water penetrable materials, such as fats or oils, are used as the binding and coating agents.

Also, with these bricks, or cakes, or units, segregation in the packaged form is substantially avoided. In a food composition consisting of loosely packed expanded peaches, sugar, and powdered pectin there will be a tendency towards separation of these materials into layers in the container or carton. However, where these materials are packed together into cakes, or bricks, bound together by a sugar binder or by a hardened fat there is no tendency towards separation of the different dry materials with the result that portions of the bricks or cakes may be used with assurance of proper proportionment and even and uniform distribution of the dry materials therein.

Cakes, bricks, or units of material as above described may include either in various combinations or individually, the expanded food materials of this invention, any other unexpanded or expanded edible materials, and also flavoring, seasoning, condiments, etc., as may be required.

The solid cake, brick or unit of the food composition described herein may be placed in a pot of boiling water and if bound together by hardened fats, for instance, the fat will melt in the water and the pieces of the food material will gradually fall from the unit so as to result very quickly in a fully prepared food material.

Although it is desired to exclude high starch containing materials such as rice, wheat, oats, corn, doughy starch products, and other high starch foods and cereals from the scope of the present invention, it is possible to include relatively low starch materials having a high water content in their natural condition and containing generally less than 25% starch, preferably less than 12% and most desirably less than 5 to 6%.

In all cases there should be such a small amount of starch that there will be substantially no tendency for the starch granules to explode during the dehydration and expansion procedures. As a result there will be substantially no tendency for the formation of a minutely porous structure but rather the tendency should be for the formation of a highly absorbent, sponge-like, large pored structure, with a fibrous unity so that there will be a minimum tendency towards disintegration.

In all cases the food material whether highly fibrous or not and whether low in starch or not, should be first dehydrated from its relatively high moisture content to a low moisture content since this appears to give it sufficient body and strength together with the fibrous structure, to withstand the expansion without disintegration and so as to retain its unit structure.

It is not desired to include within the scope of the present invention seeds, grains, nuts, and similar materials which contain little moisture in their original raw condition, or which in their original raw condition are contained within a hard shell, hull, or similarly hard outer covering, as these materials present a different problem for expansion.

Where the food structure is fibrous, it is advantageous to cut the structure before dehydrating and expansion, or before expansion, so that interior portions of the vegetable, fruit, meat, or fish will be exposed, and so that these materials will be in relatively smaller pieces. These food materials preferably should be cut both along and across the fibres. As a result of cutting these materials into these smaller portions the expansion will be greater because the explosion within the pieces thereby tends to form more widely distributed exploded portions and pores.

It is usually found in expanding these starchless or relatively low starch fruits, vegetables, fish and meats that the expanded pieces are in irregular and uneven shapes. This is due to the fact that the explosions take place unevenly and form uneven pockets, pores and passages within these pieces, whereas in high starch foods, and particularly where there are hard outer hulls or shells, the resultant expanded pieces are quite even and regular in shape.

It is also generally preferred in many cases that the firmness, texture, or consistency of the material before expansion and after dehydration should be of a nature that may be described as being relatively readily chewable, or capable of being readily cut with an ordinary kitchen knife immediately after dehydration or before the food dries out.

The expanded structure of the foods of this invention is of value in that it permits rapid solution or expression or extraction of the soluble essences, flavors, vitamins, etc. from the food material in a hot or cold, aqueous or oil medium, depending upon whether these essences, etc., are water or oil soluble. The expressions or extractions may be for food or therapeutic purposes. Pectin may be more readily extracted from dehydrated and expanded citrus peels or the albedo thereof, carotene may be extracted more readily from dehydrated and expanded carrots, and other extractions, flavorings, etc., may be similarly extracted or obtained.

If food products are dried to a very low moisture content as for example under 2 to 3%, or if these food products are allowed to remain in storage or under storage conditions so that they dry out, or so that their moisture content is reduced below 2 to 3%, they generally become quite hard and brittle and it is very difficult and at times practically impossible to soften the food material by ordinary cooking, boiling or soaking procedures sufficiently to enable proper use.

However, with the present invention, it is possible to dry many foods to a very low moisture content and then readily prepare them for consumption by the expansion process above described. When the food material is under a moisture content of around 2% or 3%, it is usually desirable to increase this moisture content to around 10% to 12% before or during expansion.

Because of the difference in the materials which may be dehydrated and expanded according to the processes of the present invention, variations in the time periods, temperatures, pressures and other conditions will have to be made in accordance with the structure and character of the particular material being processed.

For example, with the class of foods having a high sugar content, such as fruits, it is desirable to use time, heat, pressure and temperature conditions within lower ranges because of the tendency of the sugar to caramelize.

With the class of foods which tend to be more fibrous or which have tougher fibres, and which have a very low sugar content as for instance, animal protein foods such as meats and fish, the various conditions above mentioned, and particularly the steam pressure, are preferably within higher ranges.

Still further, with the class of foods such as vegetables, which have a lower sugar content than fruits and which have an intermediate fibre structure as compared to fruits or meats and fish, it is preferable to treat them at temperatures, pressure, and for time periods within intermediate ranges.

Although as stated above it is possible to expand the food products after they have been left standing following dehydration, nevertheless it is preferred in many cases to expand them substantially immediately upon completion of the dehydration process or at least while the interior portion of the food material is softer than the exterior portion. The dehydrated food should preferably have immediately before the expansion process a greater moisture content in its interior than it has in its exterior portions. The softer quality of the interior portion should not be of a dry, powdery softness, but of a moisture softness.

This type of structure appears to lend itself much more readily to expansion and to form a better type of product and a better structure for this process. This is apparently due to the fact that the harder outer wall provides a firm wall that results in higher pressures forming within the food, and then, when the pressure ruptures this harder exterior surface, the softer interior more readily expands to provide the desired structure.

What is claimed is:

1. Structure disrupted, expanded, low starch, readily water permeable, dry of free water, originally high water vegetables, containing a water content substantially lower than in their natural condition, said water content ranging between 2% and 35% to enable more quickly cooking quality, and said foods exhibiting the quality of being more quickly cookable than in their prior condition, and retaining substantially their unity after disruption and during cooking.

2. The method of disrupting and expanding the structure of low starch, naturally high water food pieces so as to make them readily water permeable and more quickly cookable, by first drying them to a moisture content substantially lower than their original water content, said moisture content to range between 2% and 35%, and then disrupting their structure without destroying substantially their unity by subjecting them in the presence of heat to an elevated pressure and then instantaneously releasing them to a substantially lower pressure.

3. A substantially solid food unit comprising structure disrupted, expanded, low starch, originally high water food pieces containing a water content substantially lower than in their natural condition, said water content ranging between 2% and 35% to enable more quickly cooking quality, and said food exhibiting the quality of being more quickly cookable than in its prior condition, said food unit consisting of food materials adhesively bound together by a binding agent which is also contained within the open pores of the food material so as to more strongly bind these food materials together.

4. Structure disrupted, expanded, low starch, originally high water food pieces containing a water content substantially lower than in their natural condition, said water content ranging between 2% and 35% to enable more quickly cooking quality, and said food material exhibiting the quality of being more quickly cookable than in its prior condition, said food material having its pores and openings impregnated with a coating material.

5. Structure disrupted, expanded, low starch, originally high water animal protein food pieces, containing a water content substantially lower than their natural condition, said water content ranging between 2% and 35% to enable more quickly cooking quality, and said food exhibiting the quality of being more quickly cookable than in its prior condition.

6. The process of making low starch animal, fibrous protein food pieces more readily cookable by first drying these materials to a moisture content substantially lower than their original water content, said moisture content to range between 2% and 35%, and then disrupting and expanding their structure by subjecting them in the presence of heat to an elevated pressure and then instantaneously releasing them to a substantially lower pressure.

7. Structure disrupted, expanded, low starch, originally high water food pieces, containing a water content substantially lower than in their natural condition, said water content ranging between 2% and 35% to enable more quickly cooking quality, and said food material exhibiting the quality of being more quickly cookable than in its prior condition.

8. Structure disrupted, precooked, expanded, low starch, originally high water food pieces, containing a water content substantially lower than in their natural condition, said water content ranging between 2% and 35% to enable more quickly cooking quality, and said food material exhibiting the quality of being more quickly cookable than in its prior condition.

9. Structure disrupted, prefrozen, expanded, low starch, originally high water food pieces, containing a water content substantially lower than in their natural condition, said water content ranging between 2% and 35% to enable more quickly cooking quality, and said food material exhibiting the quality of being more quickly cookable than in its prior condition.

10. The method of disrupting and expanding the structure of low starch, naturally high water food pieces, by first drying them to a moisture content substantially lower than their original water content, said moisture content to range between 2% and 35%, and then disrupting their structure without destroying substantially their unity by subjecting them in the presence of heat to an elevated pressure and then instantaneously releasing them to a substantially lower pressure, and then repeating at least one more time the process of elevating and instantaneously releasing the pressure as noted herein.

11. An aerated substantially solid food unit comprising structure disrupted, expanded, low starch, originally high water food pieces containing a water content substantially lower than in their natural condition, said water content ranging between 2% and 35% to enable more quickly cooking quality, and said food exhibiting the quality of being more quickly cookable than in its prior condition, said food unit consisting of food materials adhesively bound together by a binding agent which is also contained within the open pores of the food material so as to more strongly bind these food materials together.

12. The method of disrupting and expanding the structure of low starch, naturally high water food pieces, by first drying them to a moisture content substantially lower than their original water content, said moisture content to range between 2% and 35%, and then disrupting their structure without destroying substantially their unity by subjecting them in the presence of heat to an elevated pressure and then instantaneously releasing them to a substantially lower pressure, and then treating them with molten hard fat at sufficient temperature and for sufficient length of time to produce sterilization of the food pieces.

13. The method of disrupting and expanding the structure of low starch, naturally high water vegetable pieces, by first drying them to a moisture content substantially lower than their original water content, said moisture content to range between 2% and 35%, and then disrupting their structure without destroying substantially their unity by subjecting them in the presence of heat to an elevated pressure and then instantaneously releasing them to a substantially lower pressure.

14. The more quickly cookable food pieces of claim 7 in which the food pieces are structure disrupted, expanded, low starch, originally high water content, moisture reduced fruits.

15. The more quickly cookable food pieces of claim 7 in which the food pieces are structure disrupted, expanded, low starch, originally high water content, moisture reduced apricots.

16. The more quickly cookable food pieces of claim 7 in which the food pieces are structure disrupted, expanded, low starch, originally high water content, moisture reduced mushrooms.

17. The more quickly cookable food pieces of claim 7 in which the food pieces are structure disrupted, expanded, low starch, originally high water content, moisture reduced peppers.

ALBERT MUSHER.